(12) United States Patent
Millett et al.

(10) Patent No.: US 8,735,834 B2
(45) Date of Patent: May 27, 2014

(54) MOBILE CARDIAC POSITRON EMISSION TOMOGRAPHY (MOPET) CAMERA

(76) Inventors: John Millett, Gainesville, FL (US); Iain Stark, Manotick (CA)

( * ) Notice: Subject to any disclaimer, the term of this patent is extended or adjusted under 35 U.S.C. 154(b) by 249 days.

(21) Appl. No.: 13/077,055

(22) Filed: Mar. 31, 2011

(65) Prior Publication Data

US 2012/0112078 A1    May 10, 2012

Related U.S. Application Data

(60) Provisional application No. 61/319,505, filed on Mar. 31, 2010.

(51) Int. Cl.
*G01T 1/164* (2006.01)
*G01T 1/29* (2006.01)

(52) U.S. Cl.
CPC ............. *G01T 1/2985* (2013.01); *G06T 1/1648* (2013.01)
USPC ............. 250/363.03; 250/363.04; 250/363.09

(58) Field of Classification Search
CPC .... G01T 1/2985; G01T 1/1642; G01T 1/1648
USPC ........................... 250/363.03, 363.04, 363.09
See application file for complete search history.

(56) References Cited

U.S. PATENT DOCUMENTS

| | | | |
|---|---|---|---|
| 4,079,257 A * | 3/1978 | Jatteau et al. | 250/363.07 |
| 5,900,636 A * | 5/1999 | Nellemann et al. | 250/363.04 |
| 6,373,059 B1 * | 4/2002 | Stearns et al. | 250/363.03 |
| 2003/0107000 A1 * | 6/2003 | Yamashita et al. | 250/363.03 |
| 2007/0221852 A1 * | 9/2007 | Lusser | 250/363.05 |
| 2008/0017803 A1 * | 1/2008 | Zhang et al. | 250/366 |
| 2008/0087833 A1 * | 4/2008 | McCroskey et al. | 250/370.08 |
| 2010/0061263 A1 * | 3/2010 | Breeding et al. | 370/252 |
| 2010/0187424 A1 * | 7/2010 | Majewski et al. | 250/363.05 |
| 2010/0288935 A1 * | 11/2010 | Majewski et al. | 250/363.03 |

* cited by examiner

*Primary Examiner* — David Porta
*Assistant Examiner* — Gisselle Gutierrez
(74) *Attorney, Agent, or Firm* — Brian B. Shaw, Esq.; Andrew J. Anderson, Esq.; Harter Secrest & Emery LLP

(57) ABSTRACT

A mobile PET imager and method for the same is provided. The mobile PET imager includes a plurality of detector modules forming a ring detector, each for nuclear radiation detection. The imager may include a plurality of attenuation source housings including sources for attenuation such that each attenuation source housing is placed between two of the detector modules. A plurality of channel cards for processing data from the plurality of detector modules may be in the imager so that each channel card is shared by more than one of the detector modules. The imager may include at least one channel card for processing data from the detector modules and at least one resistor network acting as preamplifier, coupling to the detector modules and the channel card such that the channel card is mounted on the detector module in layer.

18 Claims, 16 Drawing Sheets

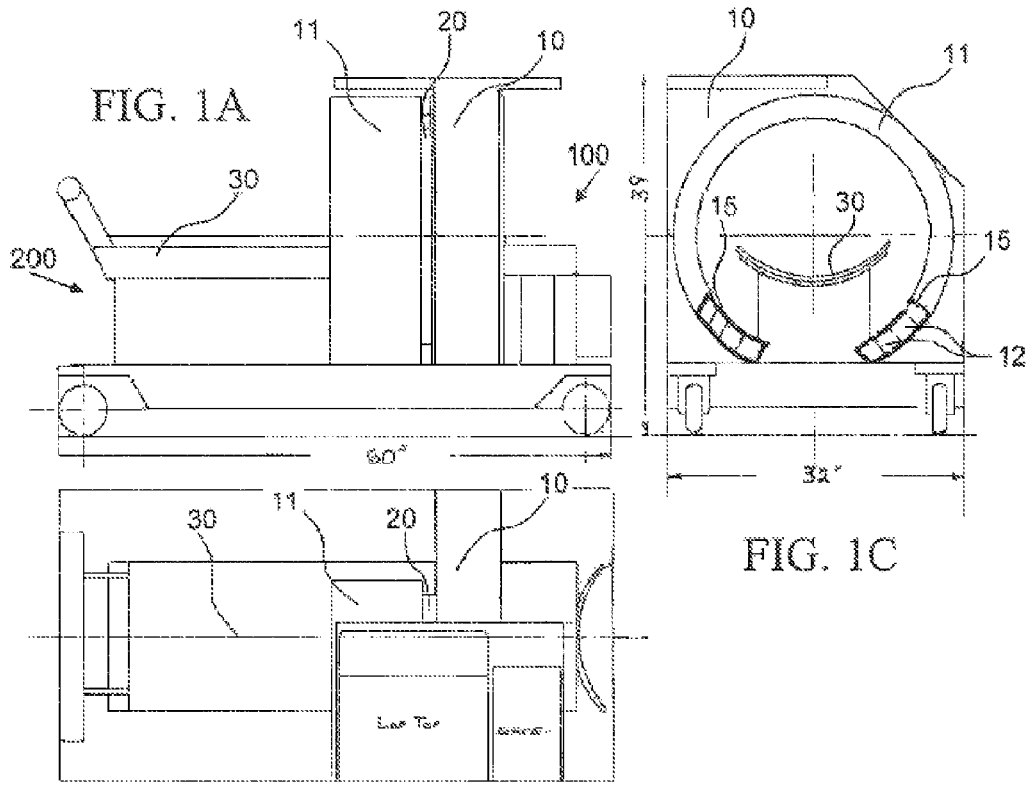
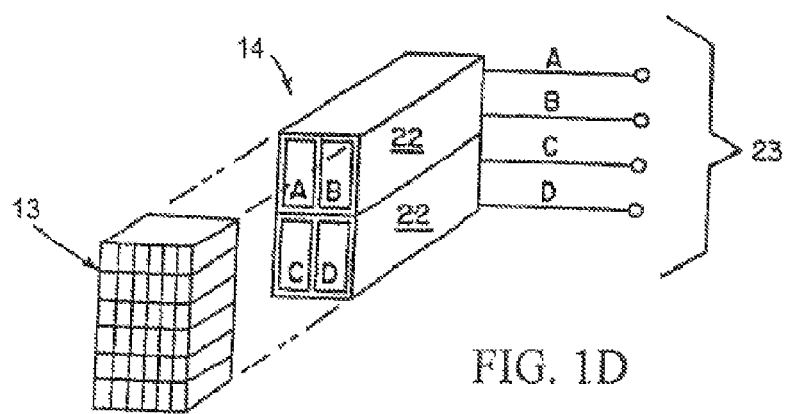

MOBILE CARDIAC POSITRON EMISSION TOMOGRAPHY (MOPET) CAMERA

CROSS-REFERENCE TO RELATED APPLICATIONS

The present application is claims priority from U.S. Provisional Application No. 61/319,505, filed Mar. 31, 2010, the entire disclosure of which is expressly incorporated herein by reference.

BACKGROUND OF THE INVENTION

1. Field of the Invention

The present invention relates to imaging systems, and more specifically to a mobile imaging system for medical diagnosis.

2. Background of the Invention

A typical positron emission tomography (or PET) scan is a non-invasive imaging process that uses a radioactive tracer or radiopharmaceutical to create 3-dimensional, color images of the functional processes of certain tissues and organs within the human body. PET scan technology is widely used in oncology to assist with detecting and staging certain types of cancer including breast cancer, lymphoma, and certain types of lung cancer. PET scanning technology is also widely used to diagnosis and assist in determining treatment options for a variety of brain-related or nervous system-related disorders and diseases, such as epilepsy and Alzheimer's disease. PET scans can also provide important information regarding the functioning of the brain. Heart disease, heart-related damage or scarring, and the general working of the heart are detectable using PET scan technology.

In order to prepare for a PET scan, commonly a patient first ingests, inhales, or is injected with a radiotracer or radiopharmaceutical. The radiotracer or radiopharmaceutical can be specific for the tissue or organ of interest. A radiotracer is a radioactive isotope that has been tagged or attached to a natural chemical. This natural chemical can be, for example, glucose, water, or ammonia. Once introduced, the radiotracer circulates throughout the body and becomes more concentrated in tissues that utilize the natural chemical. For example, the radioactive drug fluorodeoxyglucose (FDG) is commonly tagged to glucose. The glucose then concentrates in those pasts of the body that use glucose for energy. For example, cancer often uses glucose in greater amounts than normal tissue, causing FDG to become more concentrated in cancerous tissues.

As the radioisotope undergoes positron emission decay within the body, it emits a positron, also known as an "anti-particle" of the electron, but with opposite charge. As the positrons move through the body they encounter electrons. These encounters annihilate both the positron and the electron, resulting in the creation of a pair of photons moving in opposite directions. Photons are detected after they exit the body and reach a scintillator of luminescent material or a detector which converts positron energy into an electric signal. The interaction of the photons with the scintillator creates a burst of light or an "event" at is detected and enhanced by an array of photomultiplier tubes, silicon avalanche photodiodes (Si APD), or other similar devices. When two oppositely disposed gamma photons each strike an oppositely disposed photomultiplier tube they produce a time coincidence event. The most significant fraction of electron-positron decays result in two 511 keV gamma photons being emitted and moving apart at almost 180 degrees. Sophisticated computer and software technology makes it possible to localize their source along a straight line of coincidence or the "line of response" (LOR). In practice the LOR has a finite width as the emitted photons are not exactly 180 degrees apart.

Time-of-flight (TOF) refers to the difference between the detection times of the two coincidence events arising from a single positron annihilation event. TOF measurement allows the annihilation event to be localized along the LOR with a resolution of about 75-120 mm FWHM (full width, half maximum), assuming a time resolution of 500-800 ps (picoseconds). Though less accurate than the spatial resolution of the scanner, this approximate localization is effective in reducing the random coincidence rate and in improving both the stability of the reconstruction and the signal-to-noise ratio (SNR), especially when imaging large objects. After being sorted into parallel projections, the LOR defined by the coincidence events are used to reconstruct a three-dimensional distribution of the positron-emitting radiotracer within the patient.

PET scan images can be combined with computed tomography (CT) images or magnetic resonance imaging (MRI) in a process called co-registration or image fusion. PET scans are often combined with CT scans to provide detailed anatomical and functional information about the organs and tissues. Results from PET/CT scans typically give additional diagnostic and treatment information than PET scan results alone. PET and PET/CT scans are most commonly used to help diagnose and re-stage cancer, evaluate the heart muscle, and detect brain abnormalities. In all cases, interpreting PET/CT or PET scan results can be a very complicated process and more generally related to oncological applications and generally be served for physicians and radiologists who have received specialized training in nuclear medicine and CT diagnosis.

PET scans differ from other imaging tests, such as Magnetic Resonance Imaging (MRI) and CT scanning, by the ability to detect changes in the body at the cellular level. The images obtained by PET scan can reveal how a tissue or organ is functioning, rather than just how it looks. This allows for the detection of a disease much earlier, often before it has progressed enough to actually affect the surrounding tissue or organs.

Despite the advantages, there are limitations to the widespread se of PET. One reason is the high cost of cyclotrons needed to produce the short-lived radionuclides for PET scanning. On-site chemical synthesis apparatus are usually required to produce the necessary radiotracers used in the process. Hospitals and universities are often incapable or unwilling to maintain such systems. As a result, third-party suppliers provide radiotracers and often supply many sites simultaneously. This limitation restricts clinical PET primarily to the use of tracers labeled with Fluorine-18, which has a half life of 110 minutes and can be transported a reasonable distance before use. Rubidium-82, which can be created in a portable generator, provides ready accessibility and easy ease of use and may be used for myocardial perfusion studies.

A further disadvantage may be the size of PET scanners themselves and ease of use, which are typically large, bulky machines that must be installed in a single location. Because of their energy and power requirements, they are usually hardwired into the building electrical system. This immovability necessitates the transport of patients to the machine, which can be difficult or impossible, in certain situations. This limits their use to those patients in the immediate vicinity or to those that are, or can be made, mobile.

Cardiac diseases are widespread in US. PET scanners are very effectively used in determining the effects of a heart attack, or myocardial infarction, on areas of the heart. They are also useful at detecting blood flow, or loss thereof, to the heart muscle and identifying areas of the heart muscle that would benefit from a procedure such as angioplasty or coronary artery bypass surgery (typically in combination with a myocardial perfusion scan). The cost of using PET scanners is not only limited by the capital cost of acquiring PET scanners but also investment adapting facility to house the PET scanners and all ancillary equipment. The cost and limitations of PET make it unlikely that a large number of physicians offices or a larger number of hospitals will be able to acquire such devices.

There is currently a need for a portable PET scanner. There is a more pressing need for a portable PET scanner capable of providing wide access to variable clinical information. A portable PET scanner could allow multiple physicians to share the costs and benefits, providing more convenient and immediate access to healthcare professionals and patients.

BRIEF SUMMARY OF THE INVENTION

It is an object of the invention to provide a method and system that obviates or mitigates at least one of the disadvantages of existing systems.

According to an aspect of the disclosure there is provided a mobile PET imager, which includes: a plurality of detector modules forming a ring detector, each for nuclear radiation detection; and a plurality of attenuation source housings including sources for attenuation, each attenuation source housing being placed between two of the detector modules.

According to an aspect of the disclosure there is provided a mobile PET imager, which includes: a plurality of detector modules forming a ring detector, each for nuclear radiation detection; and a plurality of channel cards for processing data from the plurality of detector modules, each being shared by more than one of the detector modules. A channel card for processing data from the more than one of the detector modules may be mounted directly on the more than one of the detector modules via a position sensitive resistor network acting as a preamplifier, using a board function According to a further aspect of the disclosure there is provided a mobile PET imager, which includes: a plurality of detector modules forming a ring detector, each for nuclear radiation detection; at least one channel card for processing data from the detector modules; and at least one resistor network acting as preamplifier, and coupling to the detector modules and the channel card such that the channel card is mounted directly on the detector module in layer Embodiments of the subject invention provide a portable PET scanner. Specific embodiments are directed to PET scanner that can provide physiological imaging of coronary blood flow. A further embodiment relates to a portable PET scanner for imaging coronary blood flow.

PET scanners in accordance with embodiments of the invention can have scintillators and photomultipliers or other detectors that are optimized for detection efficiency in the energy range of up to, for example, 540 KeV. Further embodiment include detector modules that can be set in different arrays, allowing the configurations to be changed if clinical applications show one array is more suitable for a particular need.

The detector assembly structure can be rotated around the patient to ensure that the exact projection data is acquired to maximize the data collection. In one embodiment, a slip ring is utilized to permit continuous rotation of the detector assembly. In a further embodiment, the slip ring allows the detector assembly to be bi-directional and provides power to the detectors and electronics.

Advantageously, the entire PET scanner, including the detector head assembly, patient bed can be mounted on a mobile gantry. In a particular embodiment, the size of the detector head assembly and mobile gantry allows the PET scanner to be moved through a standard size doorway.

BRIEF DESCRIPTION OF THE SEVERAL VIEWS OF THE DRAWING(S)

In order that a more precise understanding of the above recited invention can be obtained, a more particular description of the invention briefly described above will be rendered by reference to specific embodiments thereof that are illustrated in the appended drawings. It should also be understood that the drawings presented herein may not be drawn to scale and that any reference to dimensions in the drawings or the following description are specific to the embodiments disclosed. Any variations of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional specificity and detail through the use of the accompanying drawings in which:

FIGS. 1A, 1B, and 1C are schematic drawings of an embodiment of a mobile PET scanner of the subject invention, where FIG. 1A shows a view of the right side elevation, FIG. 1B shows a top planar view, and FIG. 1C shows a view of the back elevation.

FIG. 1D is an illustration of an embodiment of a detector utilized in PET scanner technology in accordance with an embodiment of the subject invention.

DETAILED DESCRIPTION OF THE INVENTION

Figure 2:
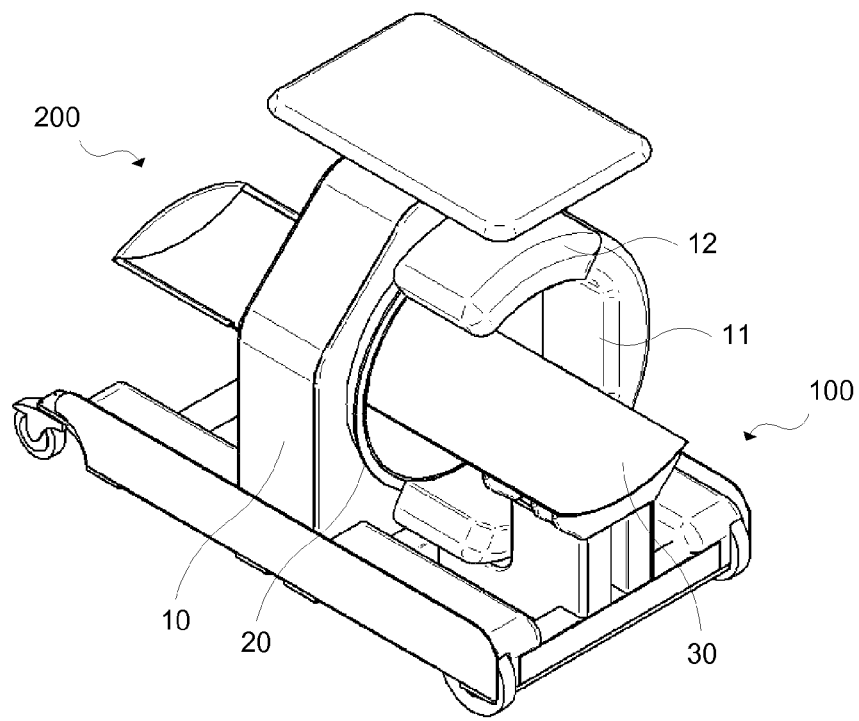
FIG. 2 is a left side perspective view of one embodiment of a mobile PET scanner of the subject invention.
Figure 3:
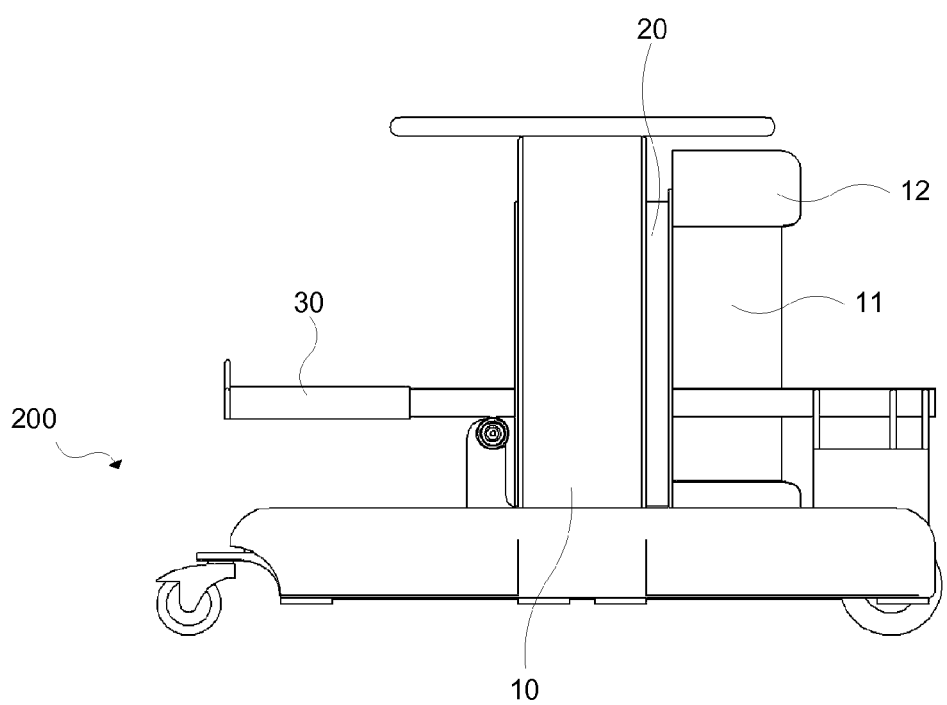
FIG. 3 is a left side elevation view of the embodiment shown in FIG. 2.
Figure 4:
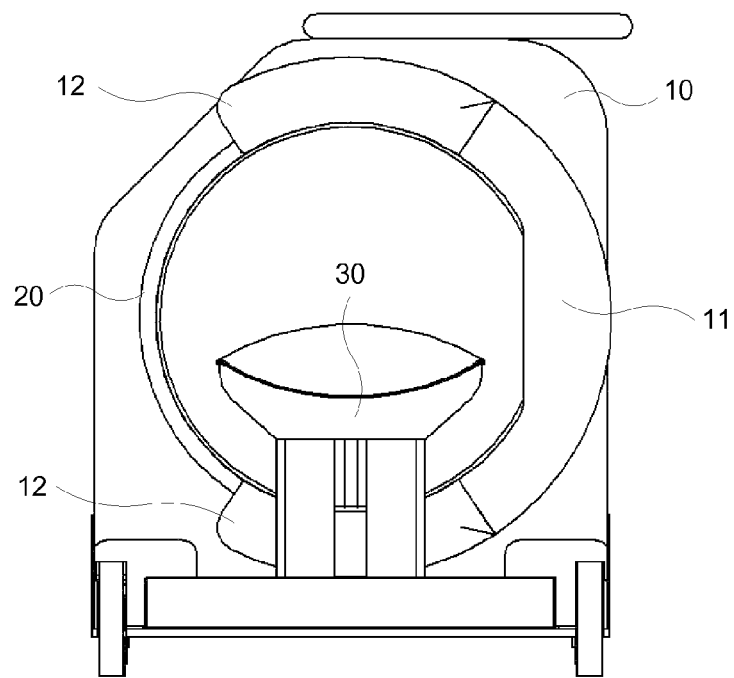
FIG. 4 is a front elevation view of the embodiment shown in FIG. 2.
Figure 5:
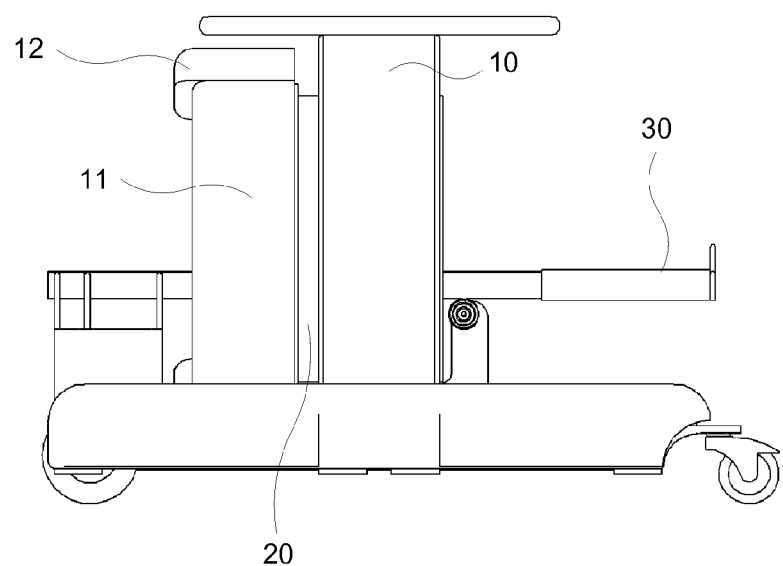
FIG. 5 is a right side elevation view of the embodiment shown in FIG. 2.
Figure 6:
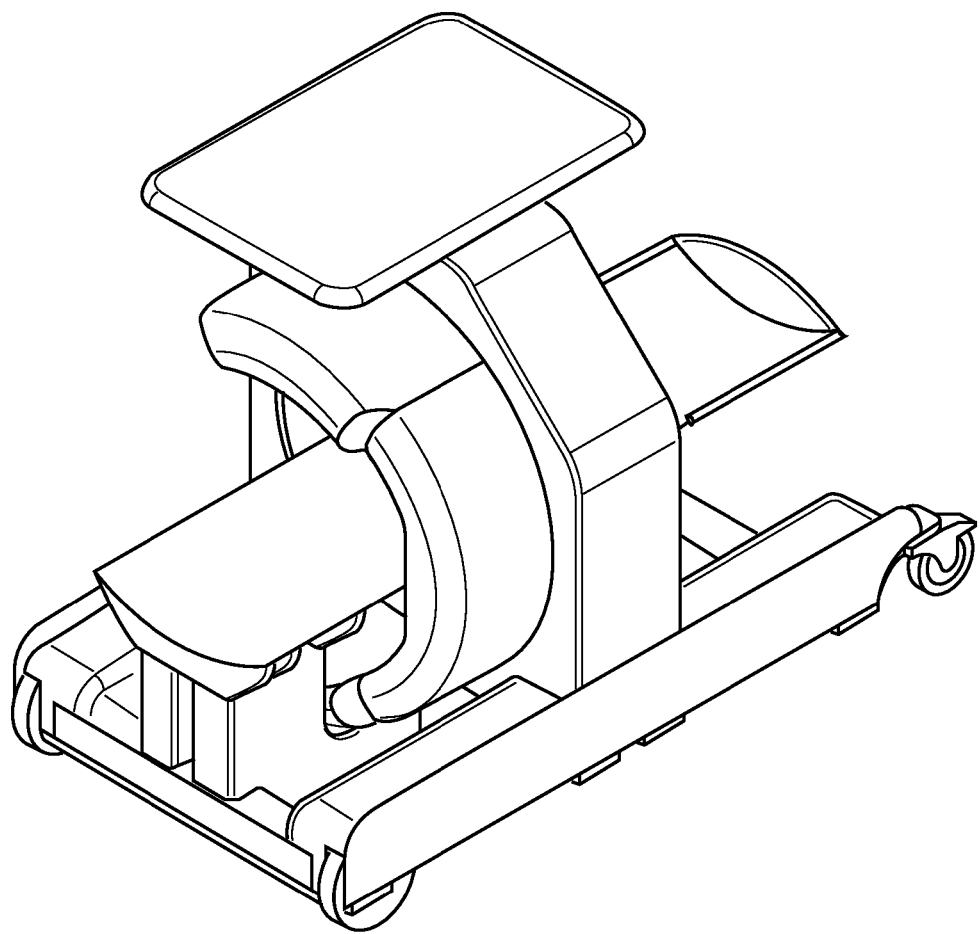
FIG. 6 is a right side perspective view of the embodiment shown in FIG. 2.

The subject invention in general describes embodiments of a positron emission tomography (PET) scanner and methods of PET scan imaging. An embodiment is directed to a mobile PET scanner. Specific embodiments of the portable PET scanner can have a standard 110 volt operating capacity. Further embodiments can have reduced dimensions and a smaller "footprint" compared to a standard PET scanner. The reduced footprint can permit the PET scanner to be moved from one location to another. In a preferred embodiment, the mobile PET scanner can operate when connected to a standard 110 volt outlet plug.

Specific embodiments are particularly useful in the field of nuclear medical imaging and, in particular, PET imaging. However, a person with skill in the art will be able to recognize numerous other uses that would be applicable to the devices and methods of the subject invention. While the subject application describes a use for cardiac imaging, other modifications apparent to a person with skill in the art and having benefit of the subject disclosure are contemplated to be within the scope of the present invention.

In the description that follows, a number of terms related to the field of nuclear imaging, particularly PET scan imaging are utilized. In order to provide a clear and consistent understanding of the specification and claims, including the scope to be given such terms, the following definitions are provided.

The term "patient" as used herein, describes an animal, including mammals, to which the systems and methods of the present invention are applied, Mammalian species that can benefit from the disclosed systems and methods include, but are not limited to, apes, chimpanzees, orangutans, humans, monkeys; domesticated animals (e.g., pets) such as dogs, cats, guinea pigs, hamsters; veterinary uses for large animals such as cattle, horses, goats, sheep; and any wild animal for veterinary or tracking purposes.

As used herein, the term "non-human animal" refers to any non-human animal, including insects, birds, rodents and more usually mammals. Preferred non-human animals include: primates; farm animals such as swine, goats, sheep, donkeys, cattle, horses, chickens, rabbits; and rodents, preferably rats or mice. As used herein, the term "animal" is used to refer to any species in the animal kingdom, preferably vertebrates, including birds and fish, and more preferable a mammal. Both the terms "animal" and "mammal" expressly embrace human subjects unless preceded with the term "non-human".

The terms "radiologist" or "technician" as used in the subject invention are merely for literary convenience. The terms should not be construed as limiting in any way. The devices, apparatuses, methods, techniques and/or procedures of the subject invention can be utilized by any person desiring or needing to do so and having the necessary skill and understanding of the invention.

Also, as used herein, and unless otherwise specifically stated, the terms "operable communication" and "operably connected" mean that the particular elements are connected in such a way that they cooperate to achieve their intended function or functions. The "connection" may be direct, or indirect, physical or remote.

The present invention is more particularly described in the following examples that are intended to be illustrative only since numerous modifications and variations therein will be apparent to those skilled in the art. As used in the specification and in the claims, the singular for "a," "an" and "the" include plural referents unless the context clearly dictates otherwise.

With reference to the attached figures, which show certain embodiments of the subject invention, it can be seen in FIG. 2 that the mobile PET scanner system includes a detector ring assembly 11 mounted within a gantry 10. The detector ring assembly 11 can be configured with two or more detector head assemblies 15 configured with a plurality of individual detector modules 12. Detectors modules can include one or more scintillators 13 or crystals, wherein each scintillator 13 is disposed in front of a photomultiplier 14. In one embodiment, a single crystal is disposed in front of a photomultiplier. In an alternative embodiment, a matrix of scintillators are disposed in front of a single photomultiplier. In a specific embodiment, the detector modules have either set in 5×5 arrays or 6×4 arrays. This can provide a 10 inch×10 inch, or a 12 inch×8 inch, respectively, sensitive area for each of the two detector head assemblies to be used in coincidence for the detection and imaging of positron isotopes. Advantageously, this design allows these configurations to be alternated from one to another if clinical applications show one is more suited to the cardiac studies for which the system is being designed. The detector modules can further be optimized for detection efficiency in the energy range of up to 520 KeV and shielded appropriately to that energy.

In one embodiment, the detector head assemblies are fixed at 180° to each other. In a further embodiment, the detector head assemblies 15 are mounted in individual housings within the shielding. The individual detectors can be removable, if necessary, for servicing. In a specific embodiment, the two or more detector head assemblies 15 are rotated around the patient. Advantageously, as the detector head assemblies 15 rotate, they can ensure that the exact projection data is acquired to maximize the data collection for the rapid decay characteristics of the radionucleotide. In a specific embodiment, the radionucleotide is formulated with Rubidium 82.

The volume between the detector head assemblies is referred to as the field-of-view (FOV). The useful field-of-view (UFOV) is defined as the area capable of receiving information. The FOV can vary depending upon a variety of factors known to those with skill in the art. In a particular embodiment of the subject invention the FOV is approximately 34 cm×20.5 cm (i.e., approximately 13.5 in.×8.2 in.). In a more particular embodiment, the UFOV is approximately 34 cm×20.5 cm (i.e., approximately 13.5 in×8.2 in.)

To ensure accurate imaging and resolution, the rotation of the detector head assemblies should be a fluid motion, with minimal or no interruption of the line of motion. In a further embodiment, the continuous rotation of the detector head assemblies 15 is obtained by the use of a slip ring, which allows the detector ring assembly 11 to be passed bi-directionally. In a further embodiment, the slip ring provides the necessary electrical power to operate the detectors and electronics.

In one embodiment, the detector ring assembly 11 and the detector head assemblies 15 mounted thereon are mounted on the gantry, such that they are not adjustable in height.

As the photons pass through the body, it is likely that one or both will be absorbed, deflected or otherwise prevented from reaching the detector head assemblies 15 (being attenuated).

This can affect the quality of the final image. By acquiring transmission images, correction for the attenuation of emission images can be performed. Acquisition of transmission scans can occur prior to obtaining the PET image. Alternatively, transmission scans can be performed after the PET image is obtained. The use of transmission images can provide significant improvement in the final image quality and enable quantitative analysis of the extent of radiotracer uptake within the targeted tissues.

Transmission scans are usually obtained by placing the patient within the scanner prior to receiving the radionucleotide formulation. A scan is then obtained during exposure by an external radionucleotide rod or point source. The transmission scan can then be compared to the PET scan. There are a variety of radionucleotide sources that can be utilized for transmission scans. In one embodiment, the detector head assemblies are fitted with a radionucleotide source appropriately shielded. In a more particular embodiment, the detector head assemblies are fitted with shielded Cs137 rods for attenuation correction measurements. In a more specific embodiment, the radionucleotide is one or two Cs137 Line source(s) having an activity of approximately 20 mCi. To ensure appropriate shielding, the CS137 can be maintained in an interlocked stainless steel and lead housing within the detector head assemblies.

Specific embodiments of the subject invention provide the PET scanner with mobility and, thus, availability to more patients and technicians. The gantry 10 design in particular can enable the detector ring assembly (camera) to be transportable and pass through a standard door size. In one embodiment, the gantry allows the entire PET scanner device to be portable and pass through a standard 32 in. door. In a further embodiment, the maximum weight of the entire apparatus is between 500 lbs. and 1,000 lbs. In a more specific embodiment, the maximum 15 weight of the entire apparatus is approximately 850 lbs. In a still further embodiment, the gantry is configured with lockable wheels. In a specific embodiment, the gantry is configured with lockable casters on the wheels.

The dimensions of the gantry 10 can vary depending upon a variety of factors. In a specific embodiment, the gantry height is approximately 144 cm. (54 in.); the width is approximately 86 cm (32 inch); the depth from the proximal end 100 to the distal end 200 is approximately 117 cm. (56 in.), when the patient bed 30 is folded down.

In one embodiment, the patient bed is adjustable within a range of approximately 25 cm. (10 in.) and can accommodate a maximum patient weight of approximately 230 kg. (500 lbs). The vertical speed of adjustment can be approximately 1 mm/sec.

In a specific embodiment of the subject PET scanner, LYSO (Cerium doped Lutetium Yttrium Orthosilicate) is used as a detector material. Such detector material can be utilized in conjunction with photomultiplier tubes, or other apparatus to provide gain to the detected photon signal, such that an output light signal, or other output signal is produced. Examples of the other materials that can be used as the detector material include, but are not limited to, NaI (Tl) (Sodium Iodide (Thallium activated)) or LaBr (Lanthanum Bromide) or BGO (Bismuth germinate Bi4Ge3O12) or LSO (lutetium oxy-orthosilicate. Specific embodiments can combine the use of one or more of these materials as detector materials and the use of 137 Cs (Cesium) and/or germanium for attenuation rods.

In conjunction with the various embodiments described, time of flight can be integrated into the image creation step, in order to enhance the output image.

Following are examples that illustrate procedures for practicing the subject invention. These examples are provided for the purpose of illustration only and should not be construed as limiting. Thus, any and all variations that become evident as a result of the teachings herein or from the following examples are contemplated to be within the scope of the present invention.

Example 1

A specific embodiment of the PET scanner of the subject invention utilizes a mobile gantry 10 system to support a detector ring assembly 11 that houses two detector head assemblies 15. In addition to the above-described embodiments, the detector head assemblies can be configured in a more specific embodiment, as follows:

A. Crystal Configuration:

Size 3×3×30 mm LYSO (Cerium doped Lutetium Yttrium Orthosilicate) ea in a 16×16 array Detector blocks: 52 by 52 mm Number of detector blocks: 24 or 25, dependent on optimum geometry B. Electronics Configuration:

| | |
|---|---|
| Photomultiplier Tubes | 52 mm square |
| Number of pixels per PM Tube | 64 |
| Number of PM Tubes | 48 or 50 dependent on final geometry |
| Energy Range | 250-680 KeV |
| Analog to Digital Conversion | 4 A to D per PMT |
| Shielding lead equivalent | 65 mm |
| Co-incidence window | 1.5 nsec |
| Implementation of Depth of Interaction correction. | |
| Time of flight implementation | |
| In Detector Head "Channel cards" | 12 Per head assembly, Total 24 |
| Digital signal processors (DSP's) | 24 "Blackfin" |

Physical, Environmental & Power Data:
 The unit can be fitted with an integral UPS
 Environmental Requirements 110 Volt AC (10%), 60 Hz; 10 Amp; single phase service, 1200 kVa (MCI's United States Cameras only)
 Heat Dissipation 2500 K joules/hr. (<2400 BTU/hr.)
 Temperature Range 15°-30° C. (59°-86° F.)+/−3° C./hr. (37.4° F./hr.)
 Max. Temperature Variance 3° C./hr. (8° F./hr.)
 Humidity 45%-80% non-condensing
 Referring to FIGS. 7-8, there is illustrated a further example of the mobile PET scanner system. The system of FIGS. 7-8 includes a plurality of detector rings, each having a plurality of detector modifies 102, and a plurality of attenuation source housings 104 enclosing attenuation sources. The detector modules 102 and the attenuation source housings 104 are alternatively disposed to form a detector ring system. The detector modifies 102 are coupled to scintillators or pixilated crystals 106 that form a ring shape. The rings are joined together and oscillate around the axis of the rings such that mage data and attenuation correction data is continuous over 360 degrees. The rings have a common center "o". The inner diameter of the rings ("D") may be suitable to take, for example, but not limited to, cardiac images. When the image of a specific region of the patient is to be take taken, at least one of the rings may be rotated/positioned.

Figure 7:
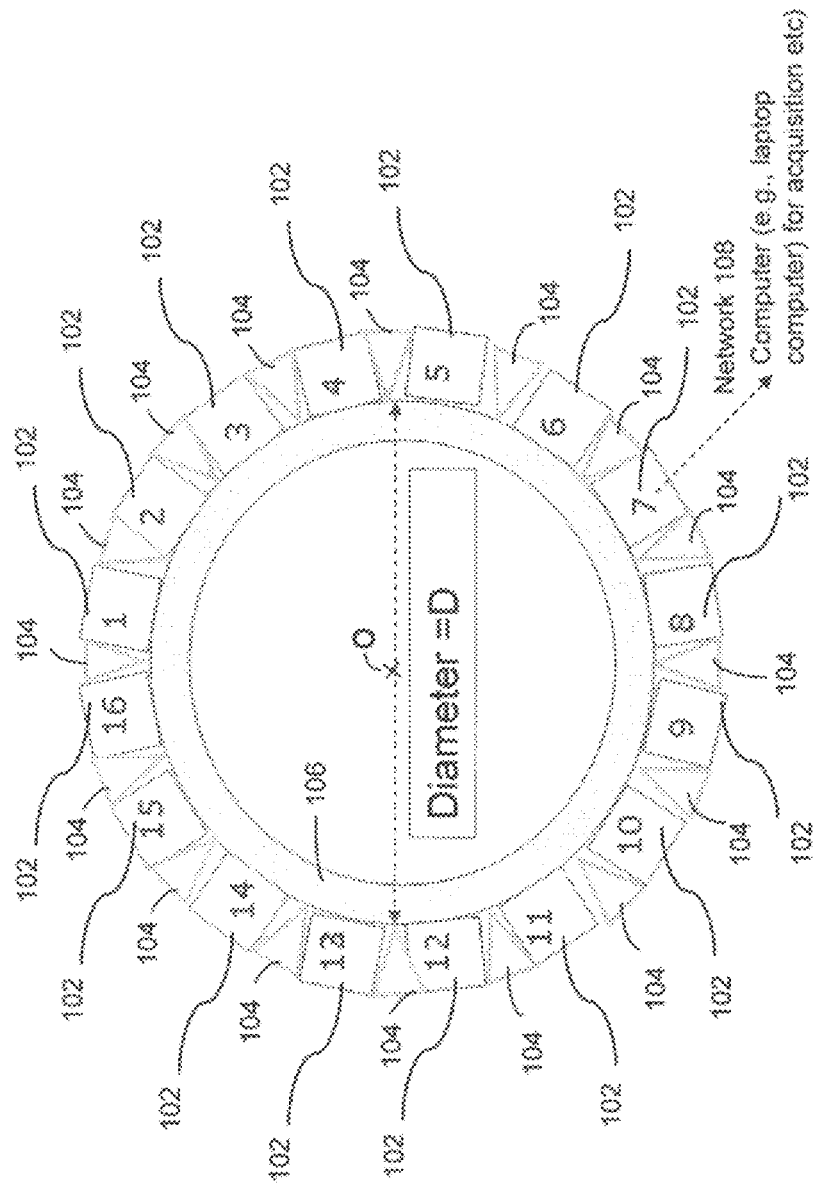
FIG. 7 is a partial front view of a detector ring system in accordance with a further embodiment of the mobile PET scanner.
Figure 8:
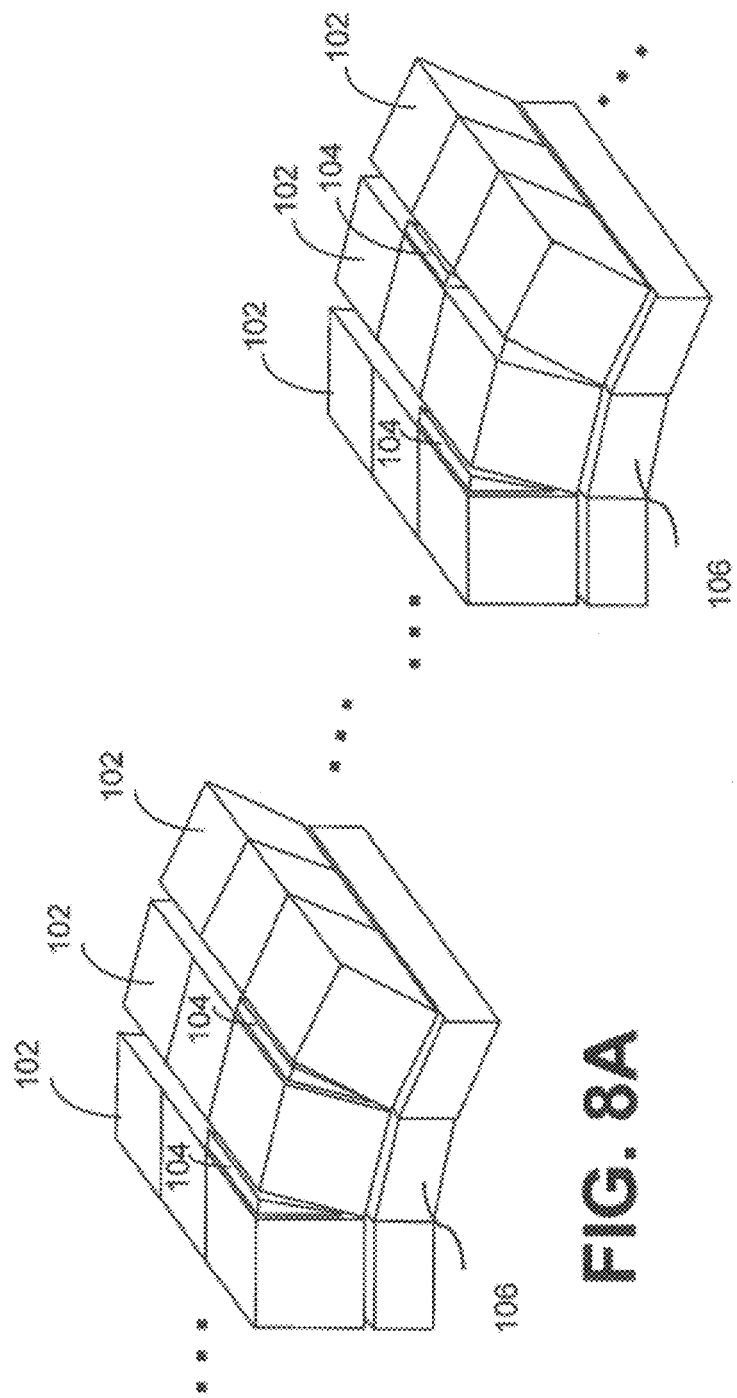
FIG. 8A is a partial perspective view of one example of the ring system shown in FIG. 7.
FIG. 8B is a partial perspective view of another example of the ring system shown in FIG. 7.

In one example, there are 3 rings (or detector rings) of 16 detector modules 102 in each PET camera, as shown in FIG. 7. Therefore, the system includes 48 detector modules 102 in total. There are 16 attenuation source housings 104 in total for the three rings. In one non-limiting example, the attenuation source housings 104 are disposed in one of the three rings such that each attenuation source housing 104 is placed between two adjacent detector modules 102 in the same ring, as shown in FIG. 8A. In another non-limiting example, the attenuation source housings 104 are disposed in the three rings such that each attenuation source housing 104 is placed between two adjacent detector modules 102 in a ring, as shown in FIG. 8B.

Each detector module 102 includes a photomultiplier tube (PMT) assembly. In the description below, "detector module" and "PMT assembly" may be used interchangeably. The PMT assembly includes an array of multianode photomultiplier tubes, which are, for example, but not limited to, Hamamatsu H8500 tubes 8×8 anodes each. The pixel size is, for example, but not limited to, 4×4 mm or 5.8×5.8 mm and the effective area is 49×49 mm. The crystal array 106 may be a LaBr3 (Ce) or LYSO pixilated crystal array. LYSO decay time may be 48 nS. The pixilated crystals may be, for example, but not limited to, 35 mm in size. The packing fraction is about 90%. In this case, PMT pulse width may be 100-150 pS.

The attenuation correction source housings 104 are made of a material which is highly attenuating for gamma rays of up to, for example, 662 KeV, such as lead or tungsten. The sources are hermetically sealed in an inert material such as stainless steel. The source housings 104 are interlocked such that the sources are open via the shutter apertures of the housings 104 to emit radiation in only certain very specific conditions to protect the patient from unnecessary radiation exposure, and this exposure is limited to the time of making the attenuation correction measurement. The attenuation correction by using the sources on the ring(s) allow for calibration of each detector and reduction of the system size. The geometry of the shutter aperture is such that only the detectors directly opposite the source housings 104 are exposed to the radiation, although the adjacent detectors in the adjoining rings may be exposed. The shutter apertures of the housings 104 may be open individually. The sequence of opening the shutter apertures may be preinstalled or programmable in a computer for operating the ring system.

Figure 18:
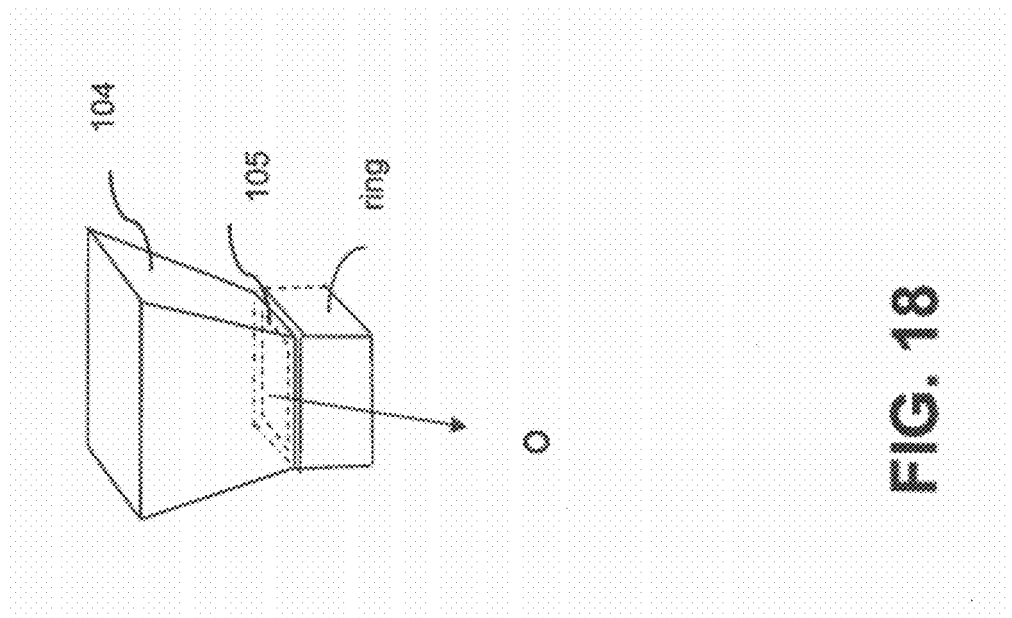
FIG. 18 is a partial perspective view of one example of an attenuation source housing in the ring system shown in FIGS. 7-8.

In one non-limiting example, the shutter aperture 105 of the housing 104 may be formed as shown in FIG. 18. The shape of the shutter aperture 105 is not limited to that shown in FIG. 18

Figure 9:
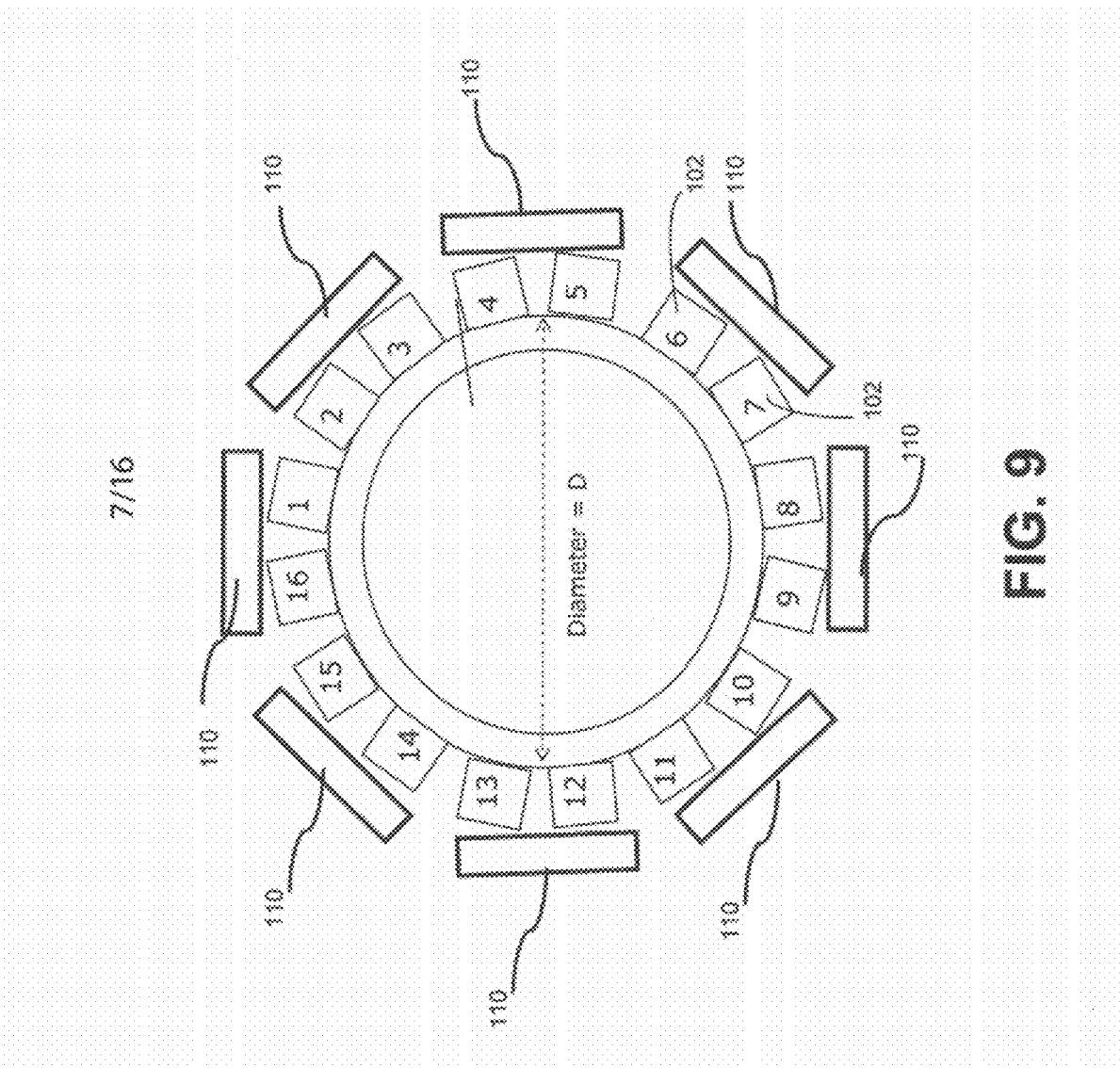
FIG. 9 is an exemplary partial view of the arrangement of channel cards in accordance with a further embodiment of the mobile PET scanner, which may be used with the ring system shown in FIG. 7.
Figure 10:
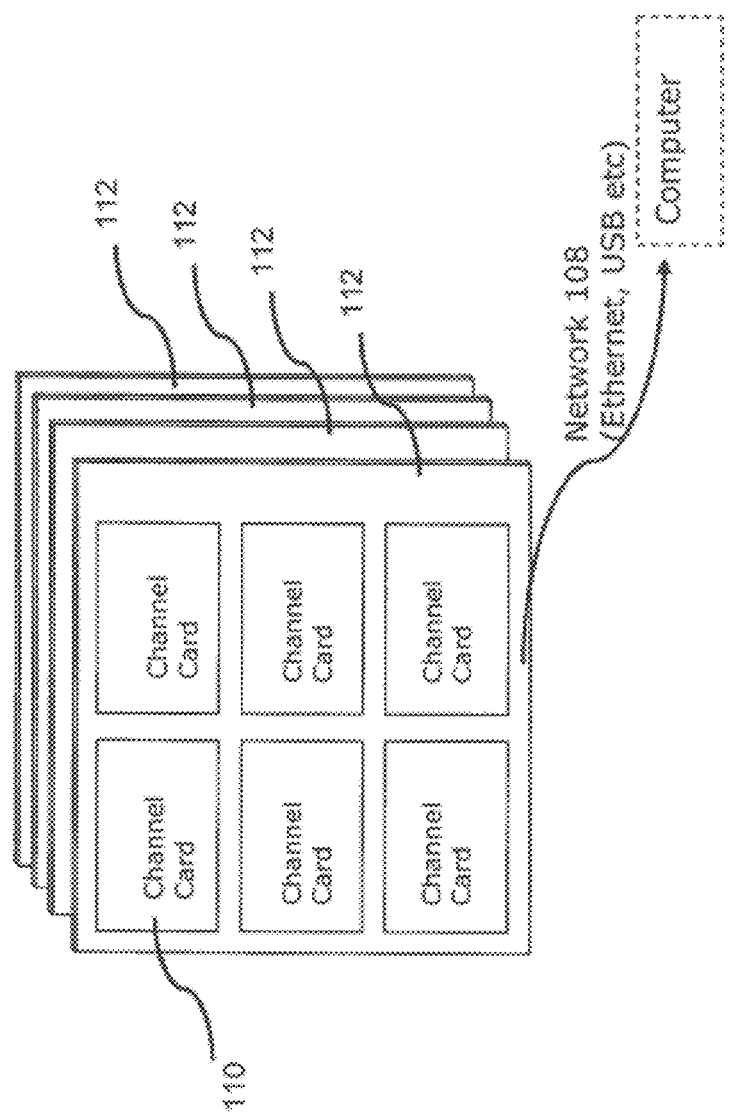
FIG. 10 is an exemplary view of the arrangement of backplanes with the channel cards shown in FIG. 9.

Referring to FIGS. 9-10, there is illustrated an example of the arrangement of channel cards 110 for the detector modules 102. The detector ring system of FIGS. 9-10 is the same of that shown in FIG. 7 except that the attenuation source housings 104 of FIG. 7 are not placed between the detector modules 102. However, the attenuation source housings 104 may be arranged to the rings of FIG. 9, as shown in FIG. 7. The channel cards 110 are coupling to the detector modules 102 such that one channel card 110 is shared by multiple detector modules 102. Backplanes 112 with the multiple channel cards 110 (channel card electronics) are coupled to the detector modules 102 and will communicate with a computer (e.g., laptop computer) 114 via a network 108. Acquisition software runs on the computer 114 so that image will be acquired. The channel card 110 implements host interface using, for example, but not limited to, Ethernet 10/100 port or USB 2.0.

In one example, there are 24 channel cards 110 in the system. 2 adjacent detector module 102 in the same ring share one channel card 110. Each channel card 110 processes outputs from two detector modules 102. The channel cards 110 are mounted directly on the detector modules 102 in layers such that there is no electrical wiring, only board function interconnects. In one example, the system includes 4 backplanes 112 with the channel cards 110 where 3 channel cards 110 are in line. 2 channel cards 110 allocated to each of the three rings may be on one backplane 112.

The backplanes 112 are mounted on the periphery of the ring and the channel cards 110 plug into the backplanes 112. The backplanes 112 act as collectors of the highly processed data from the channel cards and transfer the stream of processed from the channel cards 110 to the laptop computer 114.

Figure 11:
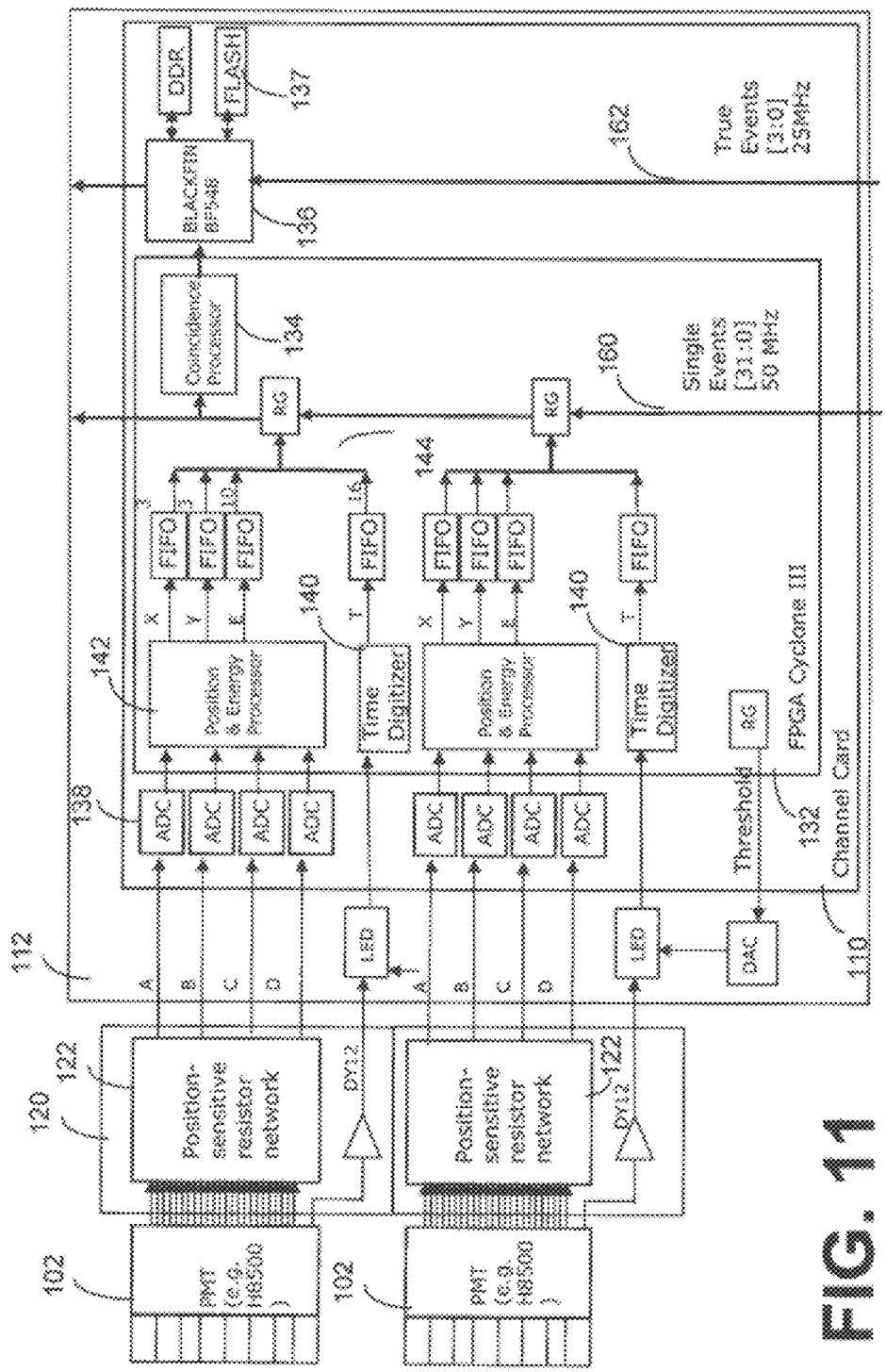
FIG. 11 is a diagram showing one example of the architecture of the channel card shown in FIG. 9.

Referring to FIG. 11, there is illustrated one example of the architecture of the channel card 110. The channel card 110 is on a motherboard 112. There is one field programmable gate-array (FPGA) 132 on one channel card 110 A plurality of detector modules 102 are coupled to the channel card 110 via a preamplifier board 120. The preamplifier board 120 includes a plurality of position sensitive resistor networks 122, each coupling to one detector module 102. In this example, there are two position sensitive resistor networks 122 in one preamplifier board 120.

The position-sensitive resistor network 122 is coupling to a plurality of Analog-Digital Convertors (ADCs) on the motherboard 112. The ADCs are integrated into one ADC package (module) 138 and mounted on the channel card 110. In this example, 4 ADCs are in one ADC package 138 for one detector module 102 Each ADC package 138 converts outputs from one position sensitive resistor network 122.

The ADC package 138 may include, for example, but not limited to, a quad, 8-bit, analog-to-digital convertor. The ADC package 138 may include, for example, but not limited to, AD9287 that is a quad, 8-bit, 100 MSPS analog-to-digital converter (ADC) with an on-chip sample-and-hold circuit.

The ADC package may include, for example, but not limited to, a dual channel, 14 bit HD image signal processor with precision timing core. The ADC package 138 may include, for example, but not limited to, AD9978, which is an integrated, dual-channel CCD signal processor where each channel is specified at pixel rates of up to 75 MHz and consists of a complete analog front end with ADC conversion.

The outputs of the ADC package 138 are sent to a position end energy processor 142 on the FPGA 132. After that digital electronics in the FPGA 112 integrates signals by summing several samples with, for example, 10 nS-13.33 nS period. The integration time is going to be around 70-150 nS which allows each channel to acquire up to 10 million counts per second. The integrated signal values are used to calculate event coordinates and energy. The ADC packages 138 are coupling to the FPGA 132 via low voltage differential signaling (LVDS) lines. The system further includes a plurality of time digitizers 140 and a plurality of FIFOs on the FPGA 132. Each time digitizer 140 is operatively coupling to one detector module 102. The output signal from the detector module 102 (e.g. the last dynode output signal from the PMT) is sent to the time digitizer 140. In this example, 4 FIFOs 144 are coupled to the position and energy processor 142 and the time digitizer 140. The FIFOs 144 are coupled to a read gate (RG).

The channel card 110 implements coincidence processor 134 in the FPGA 132 and a processor 136. The FPGA 132 may be, for example, but not limited to, FPGA Cyclone III. An annihilation event is endorsed in the coincidence processor 134. The processor 136 has a software flexibility and scalability for convergent applications. The processor 136 may be, for example, but not limited to, Blackfin BF 548. Time-of-flight (TOF) and/or Depth of Interaction (DOI) correction is implemented in the processor 136. One or more than one memory 137 (e.g., Flash, DDR) may be provided to the processor 136.

Single events are not events from a positron annihilation; they are scattered events or "random events. True events are the events detected from a positron annihilation and are in "coincidence" with one another, therefore in the "coincidence window" which is defined as, for example, 1.5 nsec. The events that are coincident in each detector are counted as "true" events.

There are two data buses 160 (SingleEvents [31:0]) and 162 (TrueEvents [3:0]) in the system. The data bus 160 is coupled to each coincidence processor 134 in the system via the RG. The coincidence processor 134 processes signal data transferred via the data bus 160. The output of the coincidence processor 134 is coupled to the processor 136. The processor 136 processes signals on the data bus 162 based on the outputs from the coincidence processor 134.

The channel card 110 and the preamplifier board 120 of FIG. 11 may be used for the ring system shown in FIGS. 7-10.

Figure 12:
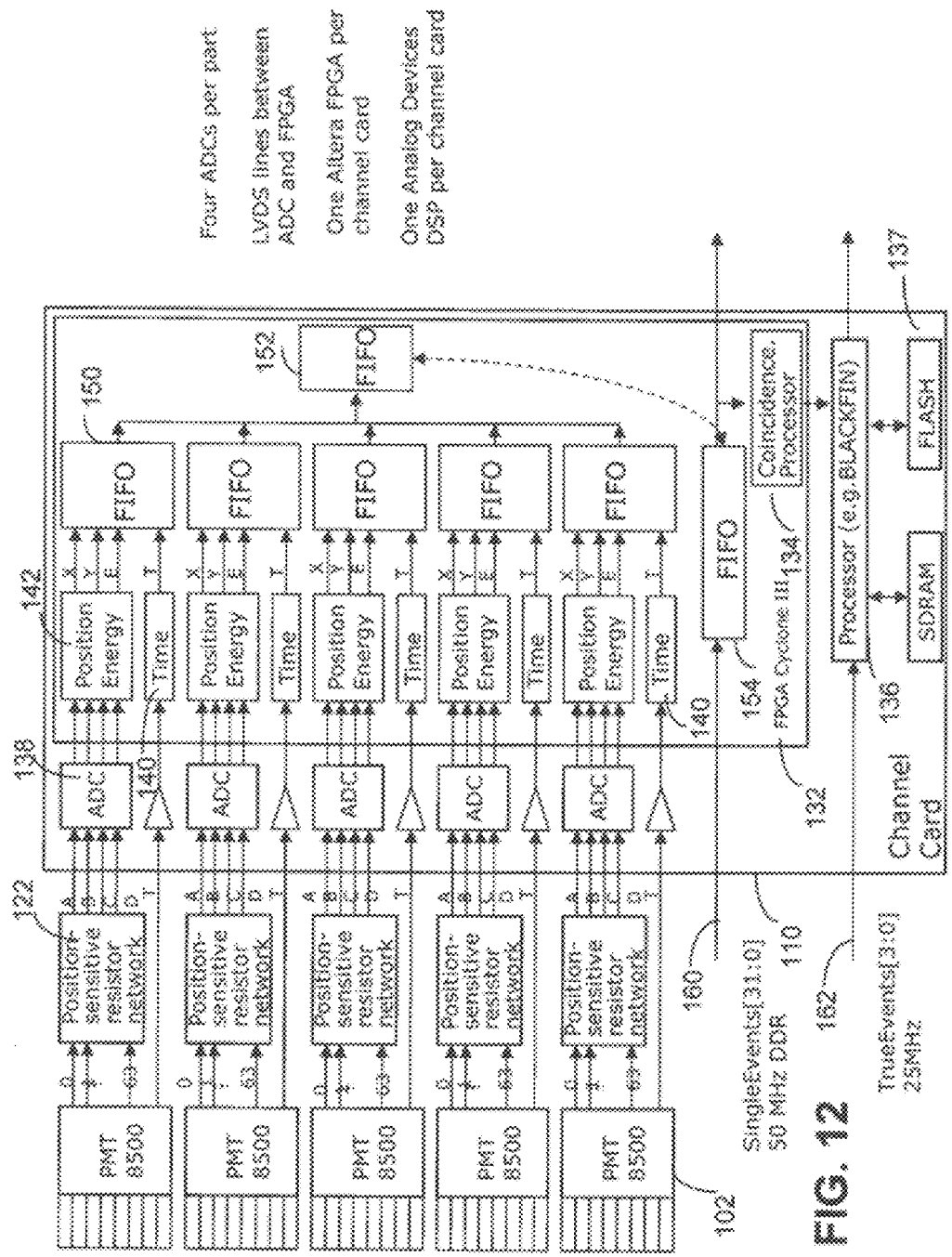
FIG. 12 is a block diagram showing another example of the architecture of the channel card shown in FIG. 9.

Referring to FIG. 12, there is illustrated another example of the architecture of the channel card 110. More than 2 position sensitive resistor networks 122 may be coupled to the channel card 110. In this example, 5 position sensitive resistor networks 122 are coupled to the channel card 110. The outputs of the positive energy processor 142 are sent to the coincidence processor 134 via multiple FIFOs 150, 152 and 154.

The data bus 160 is coupled to each coincidence processor 134 in the system via the corresponding FIFO 154. The processor 136 processes signals on the data bus 162 based on the outputs from the coincidence processor 134. The channel card 110 and the preamplifier board 120 shown in FIG. 12 may be used for the ring system shown in FIGS. 7-10.

Figure 13:
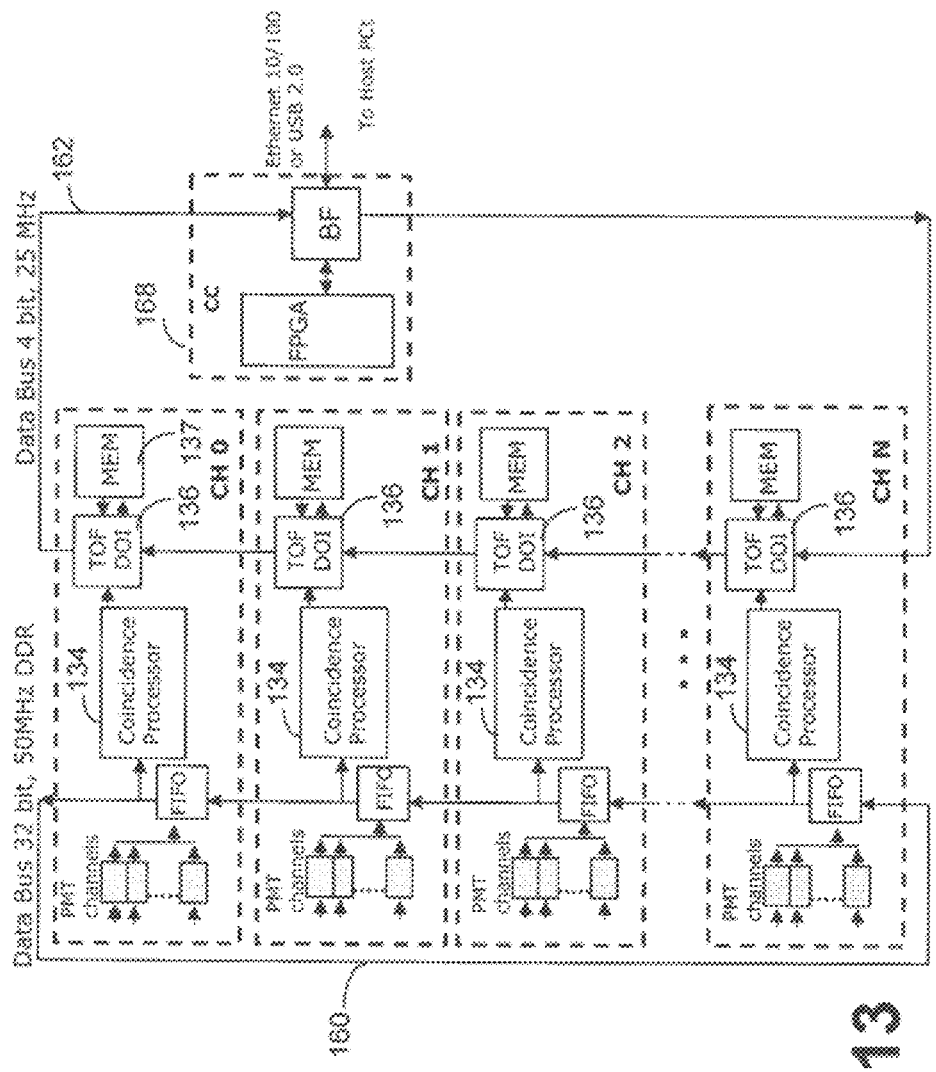
FIG. 13 is a block diagram showing one example of data transfer in accordance with a further embodiment of the mobile PET scanner.

Referring to FIG. 13, there is illustrated an example of data transfer for image acquisition. The data transfer shown in FIG. 13 may be applied to the ring system shown in FIGS. 7-9. The system of FIG. 13 includes channels 1-N (CH 0 to CN N: N being integer). Each channel CHi (i=1, . . . , N) processes PMT channel data by the coincidence processor 134 and the processor 136 with the memory (MEM) 137. Each processor 136 on channel CHi receives the output of the corresponding coincidence processor 134 and data on the data bus 162 Each coincidence processor 134 on channel CHi receives PMT channel data via the data bus 160. Each channel may be shared by multiple PMTs, similar to the channel card allocation shown in FIG. 9. A processing buffer 168 is provided to maintain the data on the data bus 162 until it can be transferred to the acquisition computer 114.

The data bus 160 may be, for example, but not limited to, a 32 bit bus with 50 MHz DDR. The data bus 162 may be, for example, but not limited to, a 4 bit bus with 25 MHz.

When three rings are used and 16 detector modules form one ring, each of 48 PMT channels (in total) can each acquire 10 million counts per second. Data bus bandwidth is up to 50 million single events per second. All true events will be saved "on fly" in 10 channel card memory buffers, 64 million events each. All events will be transferred to Host PC in non-realtime mode with 1 Mcps bandwidth for Ethernet or 4 Mcps for USB.

The PET imager may implement constant fraction discrimination for better timing accuracy and avoiding jitter (to avoid "time walk") by using the coincidence processor 134.

Figure 14:
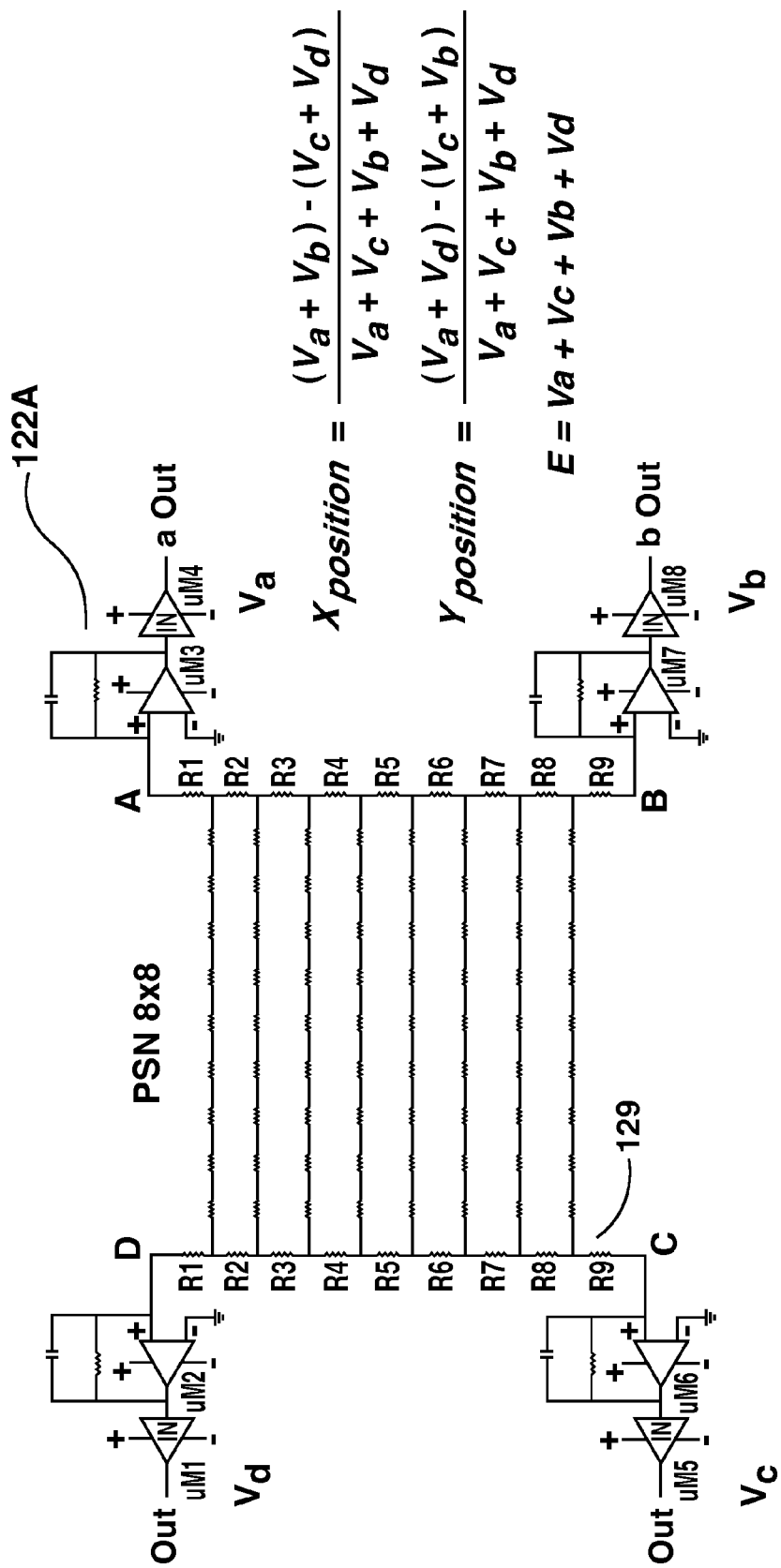
FIG. 14 is a block diagram showing an example of a position sensitive resistor network which may be used for the channel card shown in FIGS. 9-11.

Referring to FIG. 14, there is illustrated one example of the position sensitive resistor network 122 shown in FIGS. 11-12. The discretized position-sensitive readout circuit (DPC) 122A of FIG. 13 is made of an array of resistors that divide the charge between 4 low-impedance op-amps. The last dynode output signal from the PMT is sent to the time digitizer (140 of FIGS. 11-12).

Figure 15:
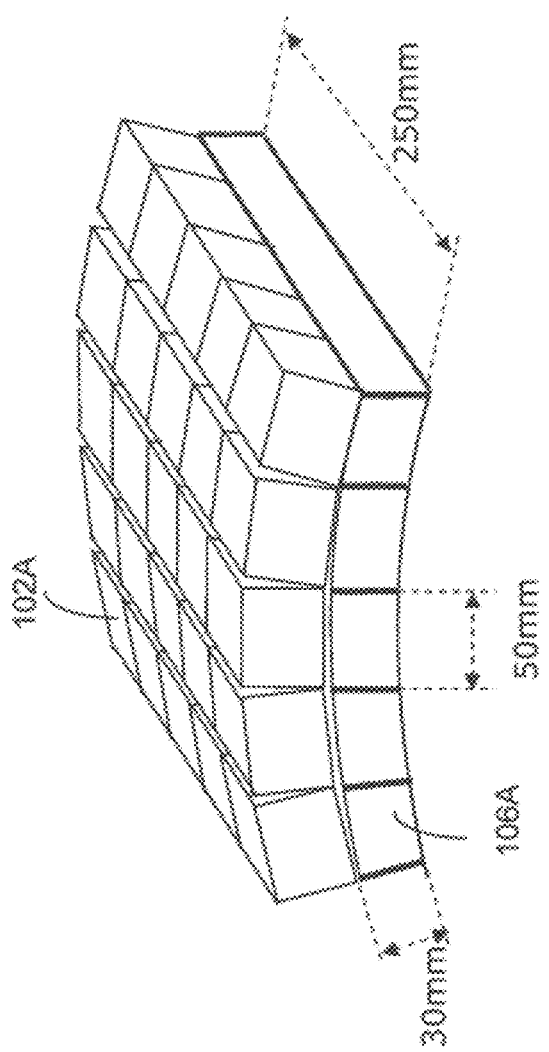
FIG. 15 is a block diagram showing another example of the ring system.
Figure 16:
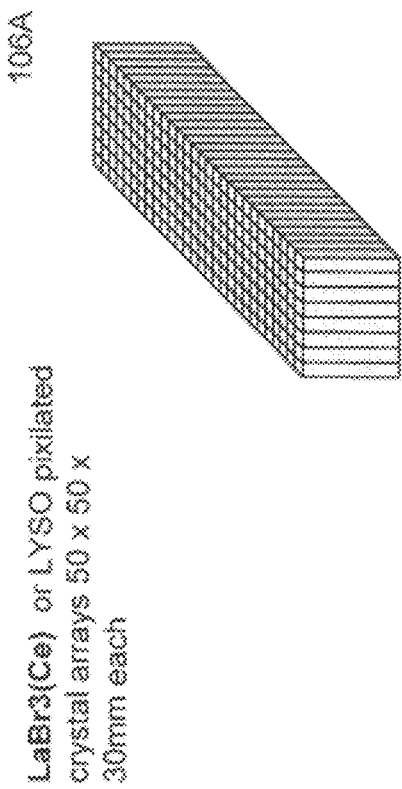
FIG. 16 is a block diagram showing one example of the crystal array shown in FIG. 15.
Figure 17:
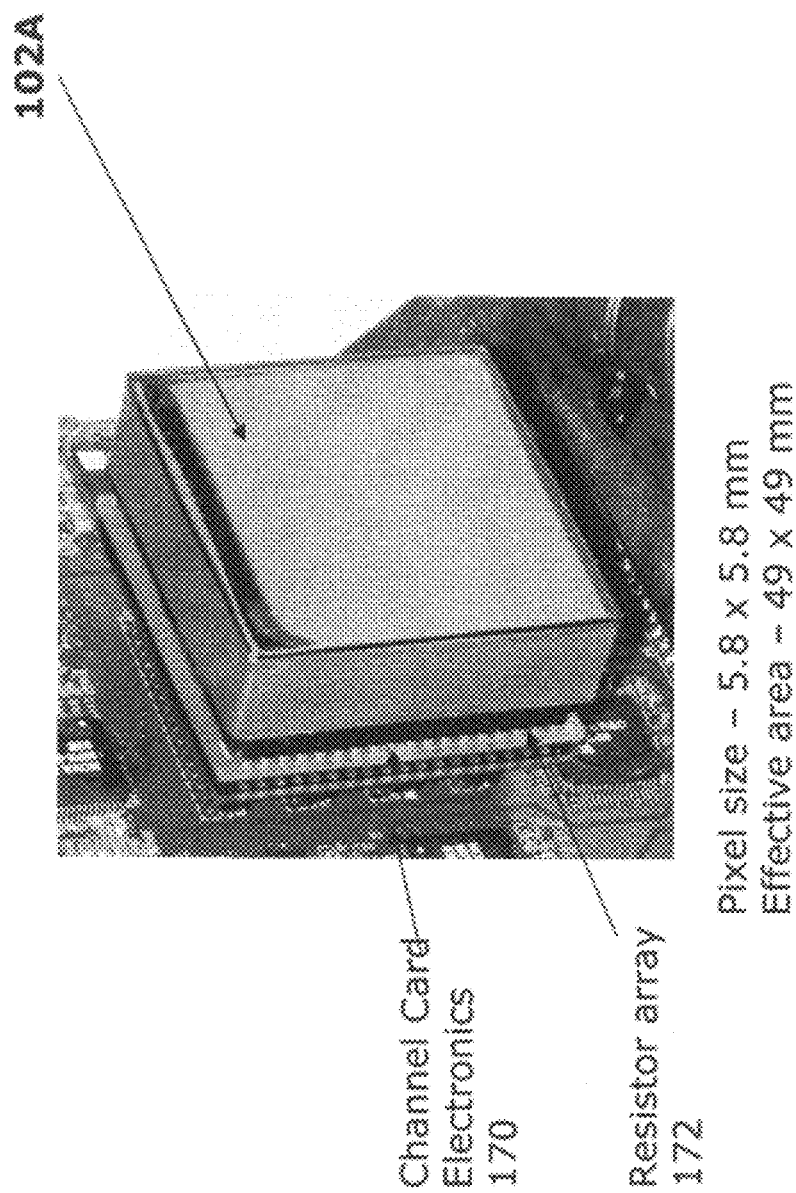
FIG. 17 is a perspective partial view of the detector module with channel card electronics.

As well appreciated by one of ordinary skill in the art that the ring may have more or less than 16 detectors, and the ring system may have more or less 3 rings. The PMT tubes and crystal arrays may be aligned as shown in FIGS. 15 and 16. In FIG. 15, the ring system does not have the attenuation source housing 104 of FIG. 7. However, the ring system of FIG. 15 may include the attenuation source housings 104 as shown in FIG. 7. In FIG. 15, 5 PMT assembles 102A are aligned in series. The scintillation crystal array 106A has a plurality of pixels, each having, for example, but not limited to, 4×4 mm or 5.8×5.8 mm in size. The crystal array 106A is, for example, a LYSO crystal array. Multiple detector modules 102A may share the channel card as shown in FIG. 12. The detector module 102A is, for example, Hamamatsu H8500. The detector module 102A may be coupled to channel card electronics 170 with a resistor array 172 as shown in FIG. 17. The resistor array 172 is, for example, but not limited to, the position sensitive resistor network 122A of FIG. 14. The channel card electronics 170 may form, for example, but not limited to, at least a part of the channel card 110 of FIGS. 11-12 or at least a part of channel CHi of FIG. 13. at least a part of the channel card 110 of Figures The channel card electronics may be mounted on the detector modules 102A such that there is no electrical wiring and only board function interconnects.

It would be appreciated by one of ordinary skill in the art that the detector rings, the detector modules 102 and the attenuation source housings 104 are schematically shown in the drawings. The numbers of the detector rings, the detector modules 102 in each detector ring assembly 100, the attenuation source housings 104 may vary. The size and the shape of each component may vary. It would be appreciated by one of ordinary skill in the art that the detector ring system may include one or more components not illustrated in FIGS. 7-18, e.g., collimator, light pipes, light guides.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

It should be understood that any reference in this specification to "one embodiment," "an embodiment," "example embodiment," "further embodiment," "alternative embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. Further, when a particular feature, structure, or characteristic is described in connection with any embodiment, it is submitted that it is within the purview of one skilled in the art to affect such feature, structure, or characteristic in connection with other ones of the embodiments.

The invention has been described herein in considerable detail, in order to comply with the Patent Statutes and to provide those skilled in the art with information needed to apply the novel principles, and to construct and use such specialized components as are required. However, it is to be understood that the invention can be carried out by specifically different equipment and devices, and that various modifications, both as to equipment details and operating procedures can be effected without departing from the scope of the invention itself. Further, it should be understood that, although the present invention has been described with reference to specific details of certain embodiments thereof, it is not intended that such details should be regarded as limitations upon the scope of the invention except as and to the extent that they are included in the accompanying claims.

The invention claimed is:

1. A mobile PET imager, comprising:
   a plurality of detector modules forming a ring detector, each for nuclear radiation detection; and
   a plurality of attenuation source housings, each attenuation source housing enclosing a respective radiation source and being placed between two adjacent detector modules in a ring of detector modules.

2. The imager according to claim 1, wherein each detector module comprises:
   a photomultiplier tube.

3. The imager according to claim 1, wherein the imager comprises;
   a plurality of ring assemblies, each having a plurality of detector modules, the plurality of ring assemblies joined together and oscillating around an axis of the ring assemblies.

4. The imager according to claim 3, wherein an attenuation source housing is located between each two adjacent detector modules on one of the plurality of ring assemblies.

5. The imager according to claim 3, wherein an attenuation source housing is located between two adjacent detector modifies on at least two of the plurality of ring assemblies.

6. The imager according to claim 1, wherein each attenuation source housing includes a shutter aperture for controlling emission of radiation from the respective radiation source.

7. The imager according to claim 1, comprising:
   a plurality of channel cards for processing data from the plurality of detector modules, each being shared by more than one of the detector modules.

8. The imager according to claim 1, comprising:
   a channel card for processing data from more than one of the detector modules, the channel card mounted directly on the more than one of the detector modules via a position sensitive resistor network acting as a preamplifier, using a board function.

9. The mobile PET imager according to claim 1, wherein the imager comprises casters for moving the imager and is sized to fit through a 32-inch door opening.

10. A mobile PET imager, comprising:
    a plurality of detector modifies forming a ring detector, each of the detector modules comprising a pixilated photomultiplier tube (PMT) for nuclear radiation detection;
    a plurality of position sensitive resistor networks, each acting as a preamplifier of a respective one of the plurality of detector modules; and
    at least one channel card mounted on at least one detector module for processing data from the plurality of detector modules.

11. The mobile PET imager according to claim 10, wherein the at least one channel card is shared by more than one of the detector modules.

12. The imager according to claim 11, wherein the at least one channel card is mounted directly on the more than one of the detector modifies it is shared by.

13. The imager according to claim 12, comprising:
    a backplane with more than one of the channel cards.

14. The imager according to claim 12, comprising:
    a first data bus operatively coupling to each detector module, and
    a FIFO for each of a plurality of channels of the at least one channel card, the FIFO coupling to the first data bus,
    data being transferred via the FIFO to a coincidence processor on the channel card.

15. The imager according to claim 12, comprising:
    a processor on the at least one channel card, the processor implementing at least one of depth of interaction and a time of flight.

16. The imager according to claim 15, comprising:
    a second data bus operatively coupling to the processor, data being transferred to the processor on the channel card via the second data bus.

17. The mobile PET imager according to claim 10, wherein more than one resistor network is mounted on a preamplifier board, and wherein the preamplifier board is coupled to one of the at least one the channel card.

18. The mobile PET imager according to claim 10, wherein the imager comprises casters for moving the imager and is sized to fit through a 32-inch door opening.

* * * * *